(No Model.)

W. H. ROGERS.
HEAD COVERING.

No. 265,541. Patented Oct. 3, 1882.

WITNESSES:
William Miller
J. A. Rutherford

INVENTOR
Washington H. Rogers
BY Van Santvoord & Hauff
his ATTORNEYS

United States Patent Office.

WASHINGTON H. ROGERS, OF HOBOKEN, NEW JERSEY.

HEAD-COVERING.

SPECIFICATION forming part of Letters Patent No. 265,541, dated October 3, 1882.

Application filed September 6, 1882. (No model.)

*To all whom it may concern:*

Be it known that I, WASHINGTON H. ROGERS, a citizen of the United States, residing at Hoboken, in the county of Hudson and State of New Jersey, have invented new and useful Improvements in Head-Coverings, of which the following is a specification.

This invention relates to a hat or head-covering composed of a layer of gutta-percha or india-rubber, known as "rubber tissue," between two layers of napped fabric, the layers being united by pressure, with the application of heat, as hereinafter more fully set forth. With the two layers of napped fabric may also be combined two layers of rubber tissue and an intervening layer of buckram.

Figure 1:
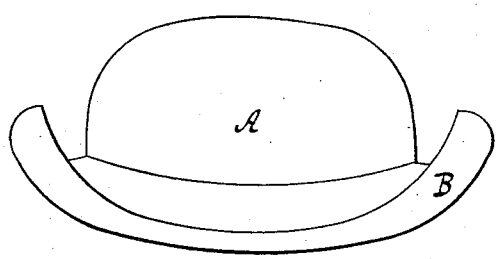
Figure 2:
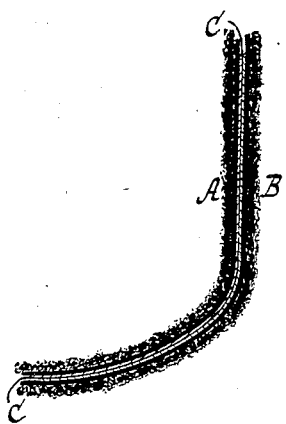

In the accompanying drawings, Figure 1 is a perspective view of a hat. Fig. 2 is a section of a portion of the same.

Similar letters indicate corresponding parts.

The letters A B designate two layers of napped fabric, and C the intervening layer or layers of rubber tissue.

In carrying out my invention I place the rubber tissue between the layers of napped fabric, bringing the plain surfaces of the napped fabric into contact with the tissue. The compound layer is then placed between suitable heated dies and pressed into the shape desired, the heat and the pressure causing the layers of napped fabric to adhere to the rubber tissue.

In finishing the hat it may be made to imitate plush, fur, beaver, or other substances, according to taste, and its brim can be curled with great ease.

I am aware that it has been proposed to use for head-coverings compound layers composed of two layers of canton-flannel, having an intervening layer either of buckram or of paper, which I do not claim. The advantage which I attain by the intervening layer or layers of rubber tissue is that the hat becomes flexible and is not liable to break or lose its shape if by accident it is knocked against a hard substance and dented; but after such accident the hat can be readily restored to its original shape. By having the intervening layer or layers of rubber tissue the hat also becomes impervious to water.

If I desire to impart to my hat additional stiffness, I take two layers of rubber tissue and between these two layers I place a layer of buckram. This compound layer is then placed between the two layers of napped fabric, bringing the plain faces of this fabric in contact with the layers of rubber tissue, and finally the hat is finished in the manner above stated.

What I claim as new, and desire to secure by Letters Patent, is—

1. A hat or head-covering made to imitate plush, fur, or beaver, composed of two layers of napped fabric and one or more intervening layers of rubber tissue, substantially as and for the purpose set forth.

2. A hat or head-covering composed of two layers of napped fabric, two or more layers of rubber tissue placed against the plain surfaces of the napped fabric, and an intervening layer of buckram, substantially as and for the purpose set forth.

In testimony whereof I have hereunto set my hand and seal in the presence of two subscribing witnesses.

WASHINGTON HUNT ROGERS. [L. S.]

Witnesses:
W. HAUFF,
E. F. KASTENHUBER.